Jan. 30, 1934. C. C. SUNDERLAND 1,945,095
REEL APPARATUS AND METHOD OF LOADING REELS
Filed Jan. 9, 1931
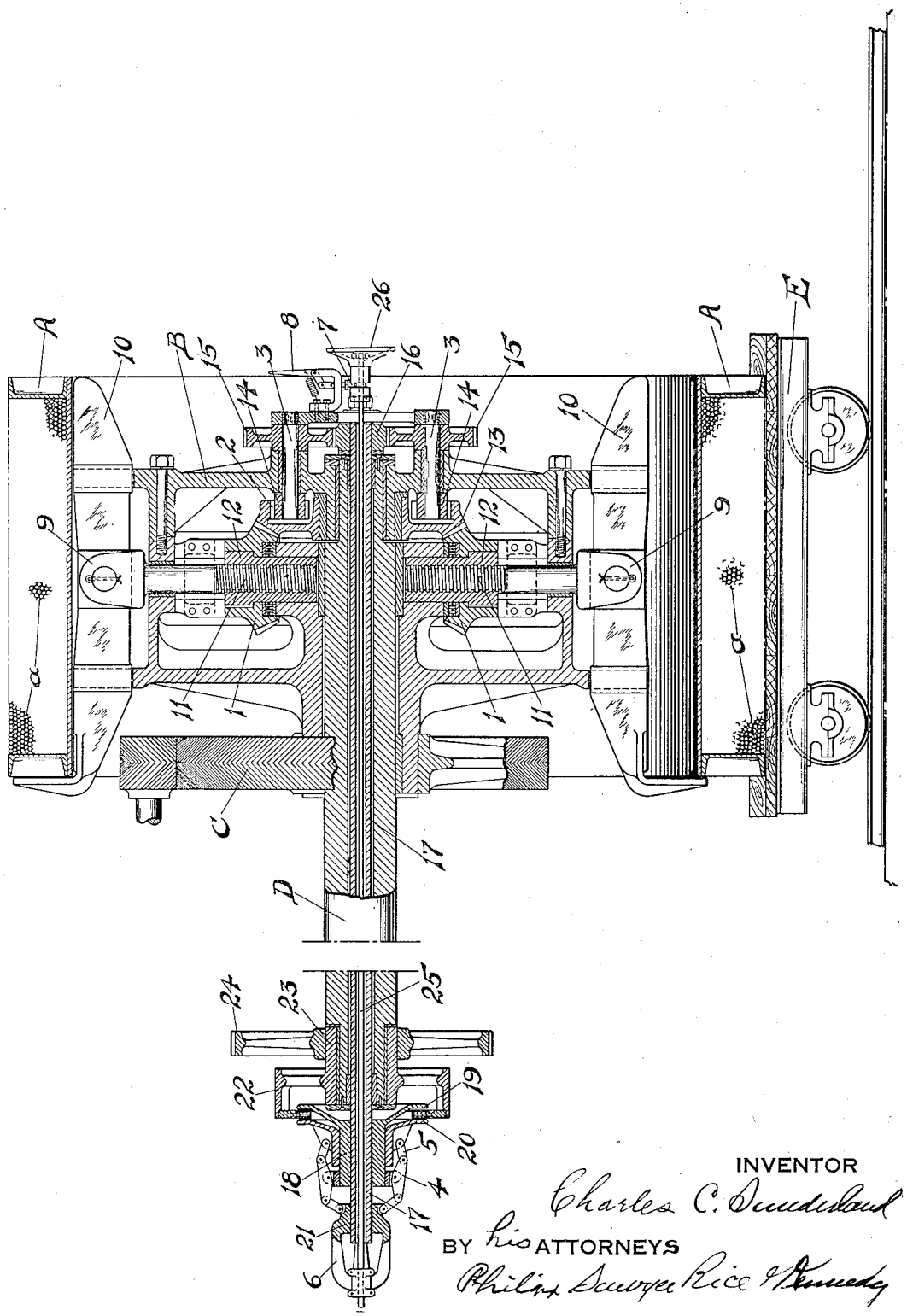
INVENTOR
Charles C. Sunderland
BY his ATTORNEYS Patented Jan. 30, 1934

1,945,095

UNITED STATES PATENT OFFICE 1,945,095

REEL APPARATUS AND METHOD OF LOADING REELS

Charles C. Sunderland, New Brunswick, N. J., assignor to John A. Roebling's Sons Company, Trenton, N. J., a corporation of New Jersey Application January 9, 1931. Serial No. 507,743

5 Claims. (Cl. 242—72)

This invention relates to reel apparatus, such as used for holding large quantities of wire or cable for reeling or unreeling, and is of especial value for unreeling on the job where large quantities of wire and many reels are required, as for instance in spinning parallel bridge cables, although generally applicable in reeling or unreeling wire or cable for any purpose.

The invention aims to provide an improved rotary reel carrier and method of loading reels by which the handling of the reels in loading and unloading is simplified and the use of expensive cranes for handling the reels in loading and unloading is avoided, thus increasing the speed and economy of bridge cable construction.

For a full understanding of the invention, a detailed description of the apparatus for carrying out my improved method and embodying the apparatus features of the invention in their preferred form will now be given in connection with the accompanying drawing forming a part of this specification and the features forming the invention then specifically pointed out in the claims.

The drawing is a sectional elevation of the apparatus, the section being taken centrally through the reel carrier.

In the drawing, A is the reel, shown as a wire reel, and carrying the wire $a$ wound thereon, B the carrier for rotating the reel in winding or unwinding the wire, this reel being shown as a driven reel actuated by gear C on its shaft D. The reel A requires only the depth necessary for holding the amount of wire to be wound thereon and may be formed, as shown, of two channel irons and a bottom plate, a cheap and strong reel thus being provided.

The carrier B is shown as a skeleton frame carrying reel supports 10 mounted to move radially for expanding and contracting the carrier to secure and release the reel thereon, these supports 10 being shown as moved inward and outward by screws 11 having their heads 9 connected to the center of the reel supports 10. Two supports 10 are shown, but it will be understood that any required number will be used. The screws 11 are moved inward and outward radially by fixed nuts 12 threaded thereon, these nuts 12 being actuated by bevel gears 1 from gear 13 having internal spur gear 2 driven by gears 14 mounted on studs 3 which carry gears 15 driven from central gear 16 on a shaft 17 extending through the hollow driving shaft D.

The hollow shaft 17 is driven for actuating the supports 10 through the gearing above described and clutched and unclutched to and from its driving means, as follows: The shaft 17 carries sleeve 18 mounted to slide on shaft 17 and having clutch member 19 fixed on shaft 17 and clutch member 20 carried by a sleeve mounted to slide on the sleeve 18. A lever and link connection consisting of lever 4 on sleeve 18 and links 5 connect clutch member 20 to a sleeve 21 mounted to slide on shaft 17 so that the movement of sleeve 21 on shaft 17 moves the clutch members 19, 20, in opposite directions to engage or release a clutch member between them carried by the wheel 22, this wheel 22 being mounted on sleeve 23 free to rotate on shaft D and driven by gear 24 driven in opposite directions by any suitable reversible driving means. Any other suitable clutch devices may be used.

It is desirable that the clutch shall be controlled from the front of the carrier, that is, the reel loading point, so that a single operator may control the expanding mechanism and loading. For this purpose, in the construction shown, the sleeve 21 is moved on shaft 17 for clutching and unclutching shaft 17 to and from wheel 22, by clutch rod 25 passing through the hollow shaft 17 and connected by yoke 6 to sleeve 21. The clutch rod 25 extends to the front of the reel carrier B and is there provided with a handle 26 for moving the clutch rod 25 longitudinally, and the clutch rod is held in normal position by catch 7 entering a groove in the clutch rod, from which it may be withdrawn by lever 8 for movement of the clutch rod.

The reel A is shown as just run onto the supports 10 by carriage E, the supports 10 at this time being withdrawn into their inner position. The reel A in this position is eccentric to the carrier so that the top of the reel is nearer to the upper support 10 than the bottom of the reel is to its support 10, as shown in the drawing, thus providing for lifting the reel from the carriage E as the carrier B is expanded by moving the supports 10 outward. The reel A having been moved by carriage E into the position shown in the drawing, the shaft 17 is clutched to the wheel 22 by the longitudinal movement of clutch rod 25 and shaft 17 is then actuated by the driving means through gear 24 and the supports 10 are then moved outward by screws 11, actuated from shaft 17 by the gearing previously described. On this outward movement of the supports 10, the reel is first lifted from the carriage E by the upper support or supports 10, and then centered on the carrier B by the movement of the supports, and the reel is thus secured on the carrier B and driven by the shaft D for reeling or unreeling the wire, or may be actuated by the pull of the wire in unreeling. For releasing and lowering the reel A for removal from the carrier, the shaft 17 is rotated in the opposite direction by reversing its driving means and the supports 10 are drawn inward and the carrier B contracted, thus returning the reel to the position shown in the drawing for removal.

It will be unerstood that the invention is not limited to the particular construction shown, but the apparatus features may be embodied in and my method of loading reels be carried out by devices differing widely from those illustrated while retaining the invention defined by the claims.

What I claim is:

1. The method of loading wire reel drums and the like for rotation which consists in moving the drum into position on an expanding drum carrier with the center of the drum below the axis of the carrier supporting the drum in said position independently of the carrier and expanding the carrier to raise the drum from the support and secure it to the carrier.

2. The method of loading wire reel drums and the like which consists in moving the drum into position on an expanding drum carrier with the center of the drum below the axis of the carrier supporting the drum in said position independently of the carrier, expanding the carrier to raise the drum from the support and secure it to the carrier for loading, and contracting the carrier to release and lower the drum on to the support for unloading.

3. The combination with an expanding reel carrier, of expanding mechanism including an actuating shaft central of the carrier, driving means and connections for said shaft, and control means central of the carrier and extending through the actuating shaft for connecting and disconnecting the driving means and actuating shaft.

4. The combination with an expanding reel and its central hollow driving shaft, of expanding mechanism including an actuating shaft extending through the hollow driving shaft, driving means and connections for said actuating shaft, and a longitudinal movable control rod extending through said actuating shaft for connecting and disconnecting the driving means and actuating shaft.

5. The combination with an expanding reel carrier, of expanding mechanism including an actuating shaft passing centrally through the carrier, clutch devices for connecting and disconnecting said shaft to and from driving means, and a clutch rod movable longitudinally through the actuating shaft for controlling said clutch mechanism.

CHARLES C. SUNDERLAND.